Figure 1:
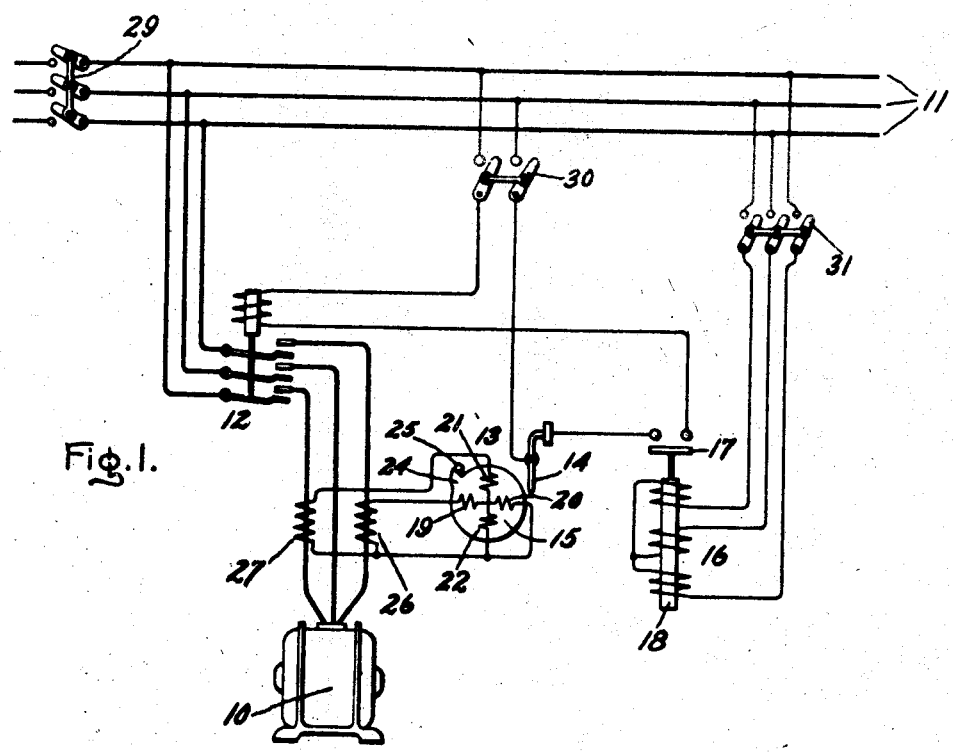

July 26, 1927.  1,637,043

B. W. JONES

PHASE FAILURE PROTECTION

Filed Aug. 28, 1925

Inventor:
Benjamin W. Jones,
by
His Attorney.

Patented July 26, 1927.

1,637,043

UNITED STATES PATENT OFFICE.

BENJAMIN W. JONES, OF SCHENECTADY, NEW YORK, ASSIGNOR TO GENERAL ELECTRIC COMPANY, A CORPORATION OF NEW YORK.

PHASE-FAILURE PROTECTION.

Application filed August 28, 1925. Serial No. 53,176.

My invention relates to protective devices for polyphase circuits which will automatically open the circuit upon a reversal of the phases and in response to a failure of a portion of the phases and keep the circuit open until polyphase energization of the circuit is restored.

The invention is particularly applicable to the control of polyphase motors, although the invention is not necessarily limited thereto. In a prior patent of mine, No. 1,620,556, dated March 8, 1927, I have disclosed and broadly claimed a phase failure, phase reversal protective device having series windings and a circuit controlling member which is operated by the windings in one direction upon normal phase energization of the circuit and operated in the opposite direction by the windings upon less than normal phase energization of the windings. In another Patent No. 1,620,555, dated March 8, 1927, in which I am a joint patentee with Nobel A. Wolfe, we have disclosed and claimed the specific form of the device which has gone into extensive use.

The device of the said applications, while entirely operative for the ordinary conditions encountered, leaves something to be desired for certain special conditions, among which is that of the automatic protection of a motor located at an isolated or somewhat inaccessible place. Since the protective device has series windings, it will be completely deenergized when the motor controlled thereby is disconnected from the polyphase supply circuit upon the failure of a portion of the phases. A feature of the device is that normally closed contacts may be employed and this type of contacts has numerous advantages for this class of service, but a disadvantage is nevertheless introduced thereby in the remote automatic control of a translating device in that when the controlled circuit is opened by the device, the less than normal phase energization of the device is discontinued and the contacts thus return to the closed position. This affects the automatic reclosing of the controlled circuit and then the immediate re-opening thereof. This "telegraph" action is obviously undesirable, and the object of the present invention is to prevent this action.

In carrying the invention into effect in the form which I now regard as the preferred form, I provide a shunt winding type protective device which cooperates with the said series winding type of device, the shunt device being constructed and arranged with its contacts in series relation with the contacts of the series type of device so that upon the failure of a portion of the phases the opening of the controlled circuit will be effected and the shunt type device will thereupon prevent the reclosing of the circuit until normal phase energization of the circuit is restored. The shunt type device is unsatisfactory for the complete and sole control of the protected circuit since if the failure of a portion of the phases occurs in the supply circuit, the device will receive polyphase energization from the motor and if the failure occurs in the motor the device will receive polyphase energization from the supply circuit. With the combination of the series and shunt winding type devices of the present invention, this difficulty is avoided.

Figure 2:
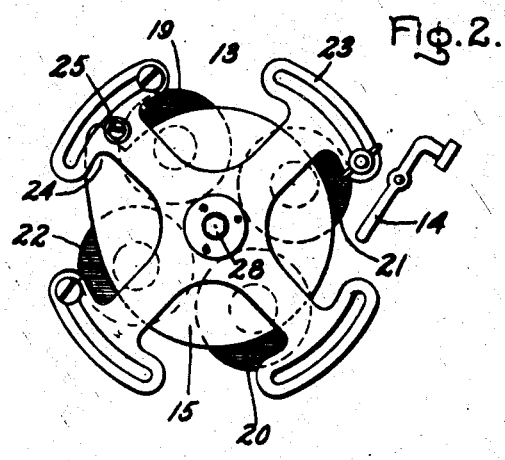

For a better understanding of the invention, reference is had to the accompanying drawings, in which Fig. 1 is a very simplified diagram of a motor control system having reverse phase and phase failure protection in accordance with the invention and Fig. 2 is a detail showing the reverse phase, phase failure protective device of the said Jones and Wolfe Patent No. 1,620,555, dated March 8, 1927.

The electric motor 10 is arranged to be connected to the three phase alternating current supply circuit 11 by means of the contactor 12. This contactor is controlled by the reverse phase, phase failure protective device 13 which has series windings in less than all of the phases. This protective device is indicated in very diagrammatical form in Fig. 1 and in Fig. 2 the construction details thereof are more fully shown. The protective device 13 has normally closed contacts, the movable contact 14 being under the control of the non-magnetic metallic disc 15 of the protective device 13. The contactor 12 is also under the joint control of the protective device or relay 16. This relay has shunt windings, as indicated, and normally open contacts, the movable contact 17 thereof being arranged to be operated by the plunger 18 of the device. In general it may be said that with polyphase energization of the supply circuit 11, the shunt windings of the relay 16 will set up a magnetic pull on the plunger 18 in such a direction that the plunger will be lifted and the contact 17 be brought in engagement with the corresponding stationary contacts so that the winding of the contactor 12 will be energized to operate the contactor and connect the motor 10 to the supply circuit. In case there should be a phase failure, either in the supply circuit 11, between the contactor 12 and the motor or in the motor itself, the disc 15 of the series protective relay 13 will operate the movable contact 14 to deenergize the line contactor 12, causing this contactor to open and disconnect the motor from the supply circuit. In case the phase failure occurs in the supply circuit 11 leading to the motor 10, the shunt type protective device 16 will also promptly operate and the contact 17 will drop, thereby cooperating with the relay 13 in effecting the opening of the line contactor 12. The opening of the line contactor will prevent the relay 16 from receiving polyphase energization from the motor so that even though the movable contact 14 of the relay 13 is permitted to automatically reclose in response to the opening of the line contactor 12, nevertheless this contactor will not be reenergized until polyphase energization of the supply circuit is restored. This is due to the fact that the relay 16 requires polyphase energization to pick up and close its controlled contacts.

In Fig. 2 I have disclosed merely a detail of the essential elements of the reverse phase, phase failure protective relay of the said Jones and Wolfe application. This relay comprises a metallic disc 15 of non-magnetic material such as copper or the like. This disc is under the control of the magnetic field set up by the windings 19 and 20 which are connected in series relation with one of the conductors of the supply circuit, and the windings 21 and 22 which are connected in series relation with another of the conductors of the polyphase supply circuit. Each of the windings of this relay is disposed on a core of magnetic material and these cores are symmetrically disposed about the axis on which disc 15 rotates. The adjustable controlling member 23 cooperates with the disc 15, the cores on which the winding of the relay are disposed and the relay windings in such a way that there are two torques set up in the disc 15, one is a single phase or tooth torque and the other is a torque set up by the rotating magnetic field produced by the windings of the relay. The single phase torque of the device is independent of polyphase energization and therefore persists after the failure of a portion of the phases of the circuit to which the windings of the device are connected. The polyphase torque normally predominates to effect a clockwise rotation of the disc 15 and keep the projection 24 of the disc in engagement with the stop 25 mounted in the adjustable controlling member 23. The single phase or tooth torque is nevertheless present but is overcome by the polyphase torque. When a portion of the phases of the circuit is opened, as for example the opening of a phase such as would deenergize the windings 19 and 20, the single phase torque set up by the windings 21 and 22 will effect a counterclockwise rotation of the disc 15 and bring the projection 24 into engagement with the relay switch contact member 14 and thus open the normally closed contacts of the relay. The windings 19 and 20 of the relay are energized from the secondary of the current transformer 26 and the windings 21 and 22 are energized from the secondary of the current transformer 27. The relation between the single phase and the polyphase torques of the relay may be adjusted by adjusting the position of the member 23 with reference to the cores on which the windings of the device are disposed. The windings and the cores on which these windings are mounted are preferably mounted on a stationary support and the adjustable controlling member 23 is mounted for a limited rotation on the shaft 28 on which the disc 15 is mounted for rotation. In practice, when the member 23 is adjusted to the desired position with reference to the cores of the electromagnets, this member will be left in that position throughout the normal operation of the device.

The relay 16 is provided with shunt windings as indicated, each winding being connected to one of the separate contactors in the supply circuit 11 and the other ends of the windings being connected together at a common point. The relay windings are interconnected in such a manner that with the phase rotation in the proper direction the resultant magnetic pull acts on the plunger 18 in the upward direction and the contact 17 is moved to the closed position. When the phase rotation is reversed, the resultant pull on the plunger 18 is applied in the opposite direction, and assisted by gravity, the plunger falls and the contacts open. This relay cannot be relied upon to operate its contacts in case of an open phase when the motor is running and remains connected to the supply circuit because of the fact that the counter polyphase potential is generated by the rotor of the motor while this rotor is in motion.

As thus constructed and arranged, and with the various parts in their respective positions as indicated in Fig. 1, the operation of my invention is as follows: Assume that the disconnecting switch 29 in the supply circuit 11 is closed and the disconnecting switch 30 in the winding circuit of the line contactor 12 and the disconnecting switch 31 in the circuit of the windings of the relay 16 are also closed. In case normal polyphase energization of the supply circuit 11 is present, the winding of the line contactor 12 will be energized from the supply circuit 11 through the contacts of the relay 13 and the contacts of the relay 16. This will effect the closing of the line contactor 12 and connect the motor 10 to the supply circuit. In case there should be a failure of a portion of the phases either in the supply circuit 11, the conductors between the supply circuit and the contacts of the contactor 12, the conductors between the contactor 12 and the motor 10 or in the windings of the motor itself, by reason of the fact that the relay 13 is provided with series windings, this relay will operate at all events and the projection 24 of the disc 15 will be brought into engagement with the switch member 14, thereby opening the energizing circuit of the line contactor 12. If the open phase occurs in the supply circuit this relay 16 will receive polyphase energization from the motor 10 until the motor is disconnected from the supply circuit so that the opening of the contactor 12 not only deenergizes the motor but also renders the relay 16 responsive to the phase failure condition of the supply circuit 11 so that this relay will then open after the opening of the line contactor 12. By reason of the fact that the relay 16 has shunt windings, this relay will not reclose its contacts to automatically deenergize the line contactor 12 until polyphase energization of the supply circuit has been restored. The relay 13, however, will automatically reclose its contacts as soon as the line contactor 12 opens, because of the fact that this relay has series windings. The motor is thus automatically protected from being reconnected to the supply circuit until the proper conditions have been brought about, namely until a polyphase energization of the supply circuit has been restored.

In case the phase failure occurs either in the motor or between the motor and the line contactor 12, the relay 13 will automatically operate to deenergize the line contactor 12 and disconnect the motor from the supply circuit. When this condition occurs, the undesirable telegraphing action previously referred to will take place. However, the occurrences of phase failure either in the motor or in the connections between the circuit interrupting device for the motor are extremely rare and a telegraphing action of the motor disconnecting device under these conditions is not of a serious practical objection because of the rare occurrence of such conditions.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States is:—

1. Phase failure protective means for polyphase circuits, the said means comprising two cooperating parts, one of said parts having series windings and mechanism under the control thereof arranged to effect the opening of the connection with the circuit upon less than normal phase excitation of said windings, and the other of said parts having windings connected in shunt relation with said circuit which control the closing of the connection with the circuit when normal phase energization of the circuit is restored.

2. In combination, a device for protecting a polyphase circuit upon the failure of a portion of the phases, the said device having a plurality of series windings and a member operated by at least a portion of the windings to effect the opening of the connection with said circuit upon less than normal phase excitation of said windings, and a second controlling device having windings connected in shunt relation with said circuit which prevents the closing of the connection with said circuit after the failure of a portion of the phases until normal phase energization of the circuit is restored.

3. In combination, a device for opening a polyphase circuit upon the failure of a portion of the phases, the said device having controlling switch contact mechanism, a plurality of series windings and a member operated by at least a portion of said windings to open said switch mechanism upon less than normal phase excitation of said windings, and a second controlling device having switch contact mechanism in series relation with the switch contact mechanism of said first device, the said second device having windings connected in shunt relation with said circuit and being arranged to prevent the closing of the connection with said circuit after the failure of a portion of the phases until normal phase energization of the circuit is restored.

4. In combination, an open phase protective device having windings connected to be energized in series relation with the translating device protected thereby, the said device having contacts which are normally in one position when said windings are deenergized and when there is normal phase energization thereof and which are operated to a second position by said windings upon phase failure, a line contactor in the supply circuit which is deenergized and opened under the control of said device upon the occurrence of phase failure and which in opening deenergizes the windings of said device, and a second protective device having windings connected in shunt relation with the supply circuit for preventing the automatic reclosure of said contactor when said contacts of said first mentioned protective device return to their biased position until normal phase energization of the circuit is restored.

5. In combination, a line contactor for a polyphase circuit, a protective device for effecting the opening of said contactor upon the opening of one or more of the phases of said circuit, the said device having series windings and normally closed controlling contacts operated to the open position by said windings upon less than normal phase excitation thereof, a second protective device for said contactor, the said second protective device having shunt windings and contacts controlled thereby to move to the open position upon the failure of a portion of the phases of said circuit, and connections through which the said devices jointly control said contactor to effect the opening of the same upon the occurrence of less than normal phase energization and keep the same open until the polyphase energization of said circuit is restored.

6. In combination, a polyphase supply circuit, an alternating current motor, a normally open contactor included between said supply circuit and said motor, the said contactor having a winding which closes and maintains said contactor closed when the winding is energized, a phase failure and phase reversal circuit controlling protective relay having series windings and connected between said contactor and said motor, the said relay having normally closed contacts for controlling said contactor winding and mechanism under the control of said windings which effect the opening of said contacts upon less than normal phase excitation of said windings and upon the occurrence of phase reversal, and a second relay having windings connected in shunt relation with said source and having normally open contacts for preventing the automatic reenergization of said contactor winding and the automatic reclosure of said contactor until normal phase energization of said circuit is restored.

In witness whereof I have hereunto set my hand this 27th day of August 1925.

BENJAMIN W. JONES.